(12) United States Patent
Boyina et al.

(10) Patent No.: US 7,073,839 B2
(45) Date of Patent: Jul. 11, 2006

(54) SEAT MOUNT ATTACHMENT TO VEHICLE UNDERBODY

(75) Inventors: Sri Boyina, Canton, MI (US); Zhonghui(Sean) Ma, Westland, MI (US); John McGuckin, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 69 days.

(21) Appl. No.: 10/976,332

(22) Filed: Oct. 29, 2004

(65) Prior Publication Data

US 2006/0091690 A1    May 4, 2006

(51) Int. Cl.
*B60N 2/02* (2006.01)

(52) U.S. Cl. .................... 296/65.09; 296/65.03

(58) Field of Classification Search ............ 296/65.09, 296/65.03, 204; 248/503.1; 297/331, 335, 297/336
See application file for complete search history.

(56) References Cited

U.S. PATENT DOCUMENTS

| | | | | |
|---|---|---|---|---|
| 3,856,347 A | * | 12/1974 | Bell et al. .................... 297/371 |
| 4,087,069 A | * | 5/1978 | Hall et al. ................... 248/573 |
| 4,822,092 A | * | 4/1989 | Sweers .......................... 296/63 |
| 5,224,750 A | * | 7/1993 | Clark et al. ............... 296/65.06 |
| 5,310,154 A | * | 5/1994 | Ueda et al. .................. 248/394 |
| 5,730,414 A | * | 3/1998 | Wenger et al. ................ 296/63 |
| 5,941,600 A | * | 8/1999 | Mar et al. .................. 296/68.1 |
| 6,053,555 A | * | 4/2000 | Neale ....................... 296/65.03 |
| 6,073,986 A | * | 6/2000 | Neale et al. ............. 296/65.09 |
| 6,129,404 A | * | 10/2000 | Mattarella et al. ....... 296/65.09 |
| 6,179,363 B1 | * | 1/2001 | Palajac et al. ........... 296/65.03 |
| 6,227,619 B1 | * | 5/2001 | Pesta et al. ............... 296/65.03 |
| 6,361,098 B1 | * | 3/2002 | Pesta et al. ............... 296/65.03 |
| 6,431,632 B1 | * | 8/2002 | Kozikowski et al. .... 296/65.03 |
| 6,547,300 B1 | * | 4/2003 | Watanabe et al. ........ 296/65.03 |
| 6,595,587 B1 | * | 7/2003 | Konishi et al. ........... 296/65.09 |
| 6,631,879 B1 | * | 10/2003 | Hibino et al. ................ 248/429 |
| 6,644,730 B1 | * | 11/2003 | Sugiura et al. ........... 296/65.09 |
| 6,676,198 B1 | * | 1/2004 | Demptos et al. ......... 296/65.09 |
| 6,682,120 B1 | * | 1/2004 | Kamida et al. .......... 296/65.09 |
| 6,932,409 B1 | * | 8/2005 | Falchero et al. ......... 296/65.09 |
| RE38,845 E | * | 10/2005 | Odagaki .................. 296/65.03 |
| 2004/0026951 A1 | * | 2/2004 | Rudberg et al. .......... 296/65.09 |
| 2005/0236879 A1 | * | 10/2005 | Kim ............................ 297/331 |

\* cited by examiner

*Primary Examiner*—Kiran B. Patel
(74) *Attorney, Agent, or Firm*—Carlson, Gsakey & Olds

(57) ABSTRACT

An attachment structure for attaching a seat assembly to a vehicle underbody includes a first cross member that extends between a pair of side rails. The first cross member includes first and second transversely extending portions that each support a striker. A second cross member also extends between the pair of side rails. First and second longitudinal members extend between the first and second cross members. The first longitudinal member is attached to the first cross member at the first transversely extending portion and the second longitudinal member is attached to the second cross member at the second transversely extending portion. Straps are mounted to each of the first and second transversely extending portions, with one strap extending underneath each of the first or second longitudinal members. The first and second transversely extending portions each include a horseshoe shaped opening over which the respective striker extends. The attachment structure provides a robust connection between the seat assembly and the vehicle underbody.

14 Claims, 5 Drawing Sheets

SEAT MOUNT ATTACHMENT TO VEHICLE UNDERBODY

TECHNICAL FIELD OF THE INVENTION

The present invention relates to a mounting structure for attaching a seat to a vehicle underbody.

BACKGROUND OF THE INVENTION

Vehicles such as station wagons and sport utility vehicles often include multiple row seating. Seats in a front row, such as bucket seats or a bench seat, are typically mounted in a fixed attachment to a vehicle underbody. Seats in a second row also can include either separate bucket seats or a bench seat. If the vehicle includes a third row of seats, the seats in the second row are typically configured to allow access to the third row of seats. In a bucket seat configuration, first and second seats are separated by a center aisle that provides access to the third row of seats. In a bench seat configuration, at least a portion of the bench seat can be tumbled forwardly to allow access to the third row of seats.

Additionally, vehicles often include an option that allows all seats in the second row to be tumbled forward. This provides increased cargo space as needed. Thus, seats in the second row are typically not mounted in a fixed attachment to the vehicle underbody. Typically, seats in the second row have a front pivot mount and a rear striker/latch mount. An occupant selectively releases latches attached to the seats from strikers mounted to the vehicle underbody. This allows the seats to be pivoted forward to a tumbled position.

Traditionally, different seat attachment structures are required to accommodate different seating configurations in the second row. One type of seat attachment structure is used to mount bucket seats to the vehicle underbody and a second type of seat attachment structure is used to mount a bench seat to the vehicle underbody. This proliferates parts and increases cost, which is undesirable.

The bench seat configuration also provides additional mounting challenges. As discussed above, when a bench seat is used in the second row, a portion of the bench seat can be tumbled to provide access to the third row of seats without requiring the entire bench to be moved to a tumbled position. This is referred to as a 60/40 split bench seat. The split bench seat option provides seating for one additional occupant. The split bench seat includes a first seat portion positioned on one lateral vehicle side, a second seat portion positioned on an opposite lateral vehicle side, and a third seat portion positioned between the first and second seat portions and attached to the second seat portion. The first seat portion is split from the second and third seat portions and can be tumbled separately from the second and third seat portions to allow access to the third row.

One mounting challenge for the bench seat configuration concerns seat restraint mounting for the third seat portion. A seat restraint includes a lap belt portion and a shoulder belt portion. The shoulder belt portion is typically attached to a vehicle structure such as a side pillar, for example. In a bench seat configuration, there is no side pillar to support the shoulder belt portion for the third seat portion.

One solution has provided a shoulder belt mount to a vehicle roof above the third seat portion. This could adversely affect a driver's view and further does not provide an aesthetically pleasing appearance. Optionally, the shoulder belt portion could be mounted directly to the third seat portion at a seat back. In this configuration all seat loads would go directly through the seat to the vehicle underbody. This provides additional structural challenges, as the seat attachment structure must be strong enough to accommodate the increased seat loads.

Thus, it is desirable to provide a seat attachment structure that can be used for a variety of seating configurations and which can accommodate seating loads for seat integrated restraints (SIR), as well as providing a tumble feature.

SUMMARY OF THE INVENTION

The invention is generally directed to a seat attachment structure for mounting a seat assembly to a vehicle underbody. The seat attachment structure includes a seat bracket assembly having a cross member that extends in a generally lateral direction between a pair of longitudinally extending side rails. The cross member includes at least first and second extensions that each support a striker. Latches on the seat assembly cooperate with the strikers to provide a tumble option.

The seat bracket assembly provides a common bracket configuration that can be used to mount any type of seat configuration. For example, in a second row of seats, the common bracket configuration can be used to mount either a pair of seats separated by an aisle or a split bench seat. In either of these configurations, the seats are unlatched and pivoted to a tumbled position to increase cargo space within a vehicle.

The split bench seat, also referred to as a 60/40 split option, includes a first seat portion positioned on one lateral vehicle side, a second seat portion positioned on an opposite lateral vehicle side, and a third seat portion positioned between the first and second seat portions. The first seat portion is split from the second and third seat portions and can be tumbled separately from the second and third seat portions to allow access to a third row of seating.

In one embodiment, the third seat portion is cantilever mounted to the second seat portion at one lateral seat side and is unsupported at an opposite lateral seat side. This feature allows the common bracket configuration to be used. Also, the third seat portion preferably has a seat integrated restraint (SIR). SIR has both lap belt and shoulder belt attachments going directly to the third seat portion. This configuration makes installation of the split bench seat into the vehicle more efficient and more cost effective, as well as providing an aesthetically pleasing appearance.

As discussed above, the seat bracket assembly includes a cross member that extends between the side rails. Preferably, the cross member is a rear cross member that supports first and second strikers on the first and second extensions, respectively. The seat bracket assembly also includes a front cross member and first and second longitudinal members. The front cross member extends generally parallel to the rear cross member in the lateral direction and is longitudinally spaced apart from the rear cross member. The first and second longitudinal members extend between the front and rear cross members. One end of the first longitudinal member is mounted to the first extension and one end of the second longitudinal member is mounted to the second extension.

The rear cross member includes a laterally extending main body with integrally formed first and second extensions. The first and second extensions are transverse to the main body and extend in a longitudinal direction. In one embodiment, the first extension includes first and second mount portions that are separated by a first U-shaped opening and the second extension includes third and fourth mount portions that are separated by a second U-shaped opening. The first striker extends across the first opening and has one striker end mounted to the first mount portion and an opposite striker end mounted to the second mount portion. The second striker extends across the second opening and has one striker end mounted to the third mount portion and an opposite striker end mounted to the fourth mount portion. A transversely extending flange is formed about a perimeter that defines the U-shaped openings to increase structural strength.

The subject seat bracket assembly can be used in different seating configurations and provides a very robust seat/underbody joint that can accommodate high seating loads. These and other features of the present invention can be best understood from the following specification and drawings, the following of which is a brief description.

DETAILED DESCRIPTION OF THE PREFERRED EMBODIMENT

Figure 1A:
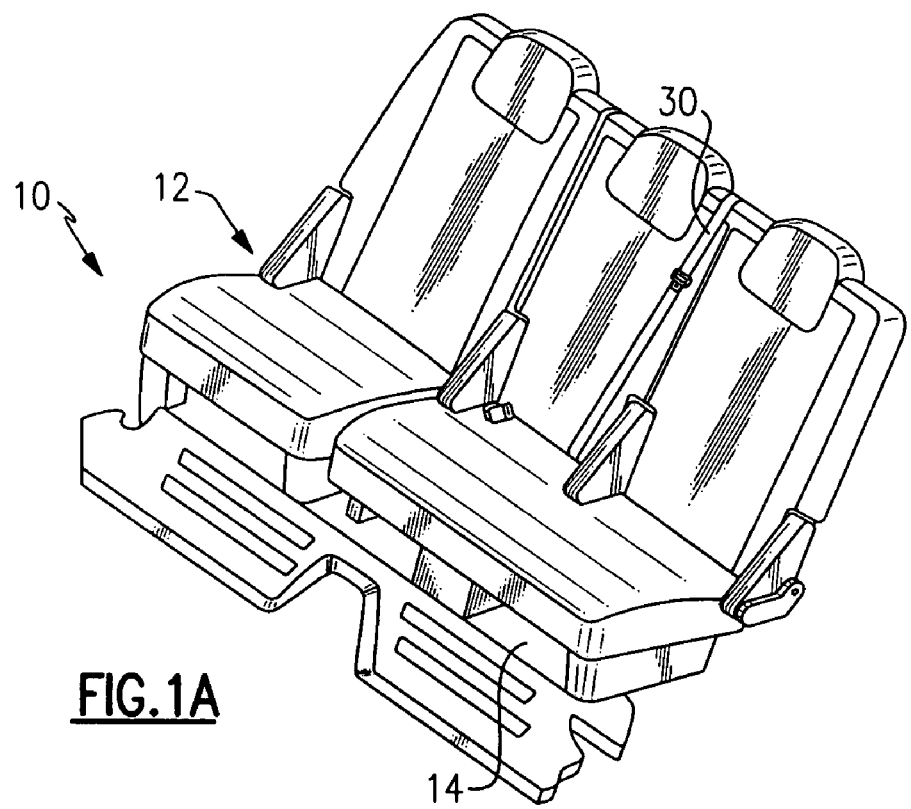
FIG. 1A shows a perspective view of a split bench seat incorporating the subject invention.
Figure 1B:
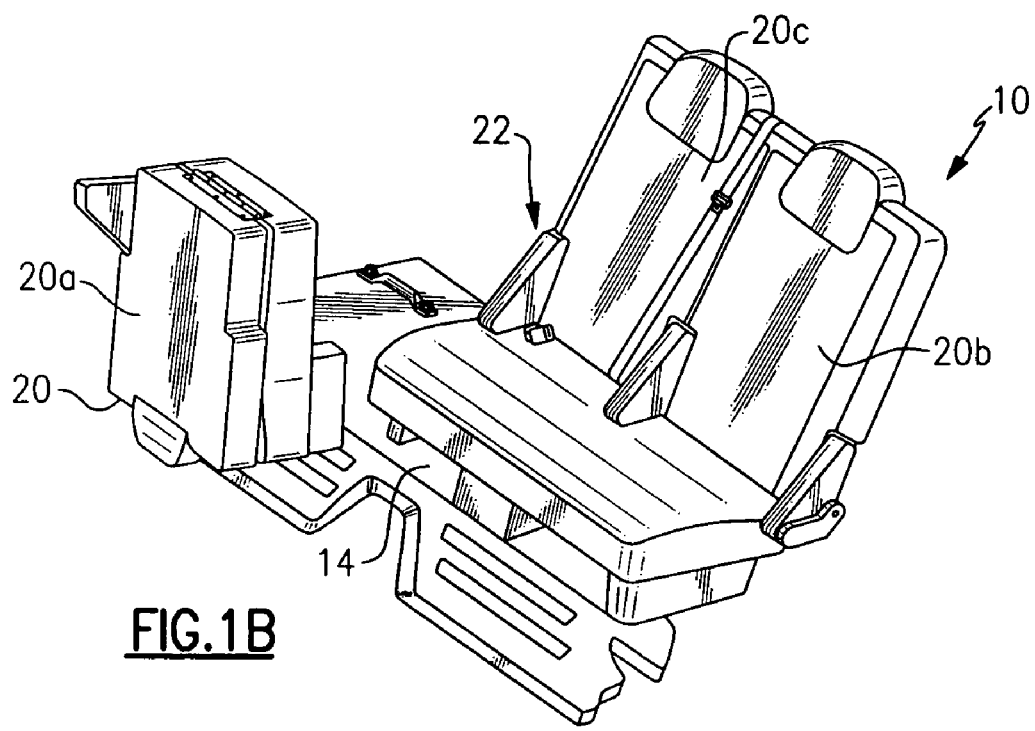
FIG. 1B is a view similar to FIG. 1A but showing one seat portion in a tumbled position.

FIG. 1 shows a seat assembly 10 having a seat attachment structure 12 for mounting the seat assembly 10 to a vehicle underbody 14. The seat attachment structure 12 includes a seat bracket assembly that provides a common bracket configuration that can be used to mount any type of seat configuration. For example, in a second row of vehicle seats, the common bracket configuration can be used to mount either a pair of seats 16a, 16b separated by an aisle 18 (see FIG. 2) or a split bench seat 20, as shown in FIGS. 1A and 1B. In either of these configurations, seats are unlatched and pivoted to a tumbled position to increase cargo space within a vehicle as needed. While the seat attachment structure 12 is described has being particularly beneficial to a second row configuration, it should be understood that seat attachment structure 12 could also be beneficial to other seating row configurations.

Figure 1C:
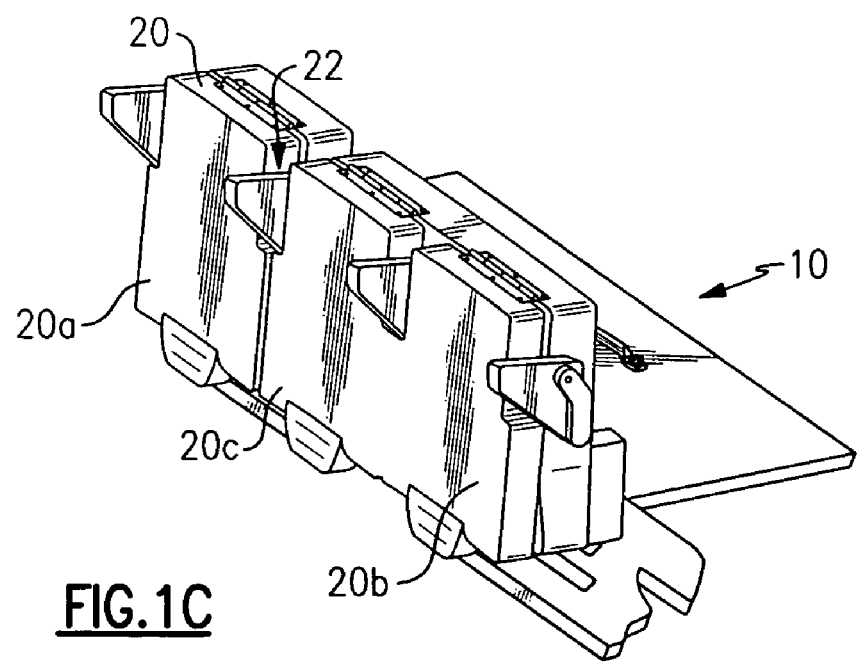
FIG. 1C is a view similar to FIG. 1A but showing the entire seat in a tumbled position.
Figure 2:
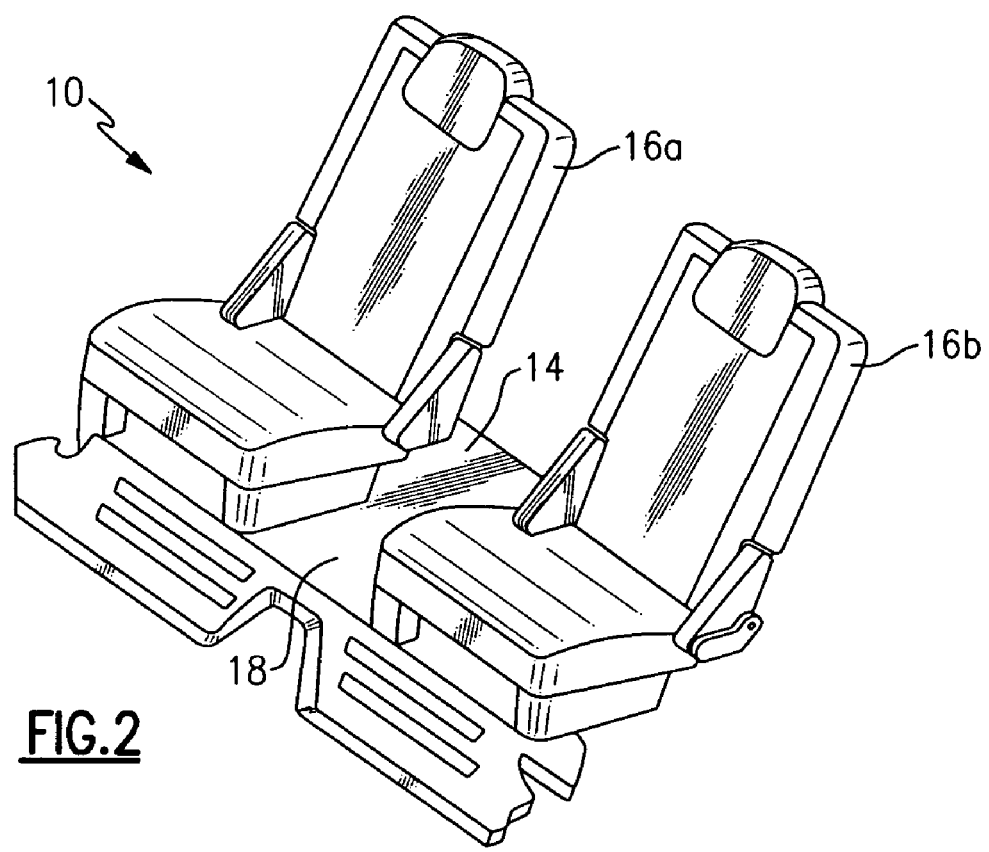
FIG. 2 shows a perspective view of an alternate seat configuration incorporating the subject invention.

The split bench seat 20 of FIG. 1A, also referred to as a 60/40 split option, includes a first seat portion 20a positioned on one lateral vehicle side, a second seat portion 20b positioned on an opposite lateral vehicle side, and a third seat portion 20c positioned between the first 20a and second 20b seat portions and supported by the second seat portion 20b. As shown, the first seat portion 20a is split from the second 20b and third 20c seat portions at 22. The first seat portion 20a can be tumbled separately (see FIG. 1B) from the second 20b and third 20c seat portions to allow access to a third row of seating. The second 20b and third 20c seat portions can also be tumbled along with the first seat portion 20a to increase cargo space, as shown in FIG. 1C.

The third seat portion 20c is cantilevered mounted to the second seat portion 20b at one lateral seat side 24 and is unsupported at an opposite lateral seat side 26 as indicated by gap 28. This feature allows the common bracket configuration to be used. In other words, the same bracket is used to mount a pair of seats 16a, 16b to the vehicle underbody 14 as is used to mount the split bench seat 20 to the vehicle underbody 14. This feature will be discussed in greater detail below.

The third seat portion preferably has seat integrated restraints (SIR) 30 (see FIG. 1A). The SIR 30 includes a seat belt assembly having a lap belt portion and a shoulder belt portion. The SIR 30 has both lap belt and shoulder belt attachment points going directly to the third seat portion 20c. This configuration makes installation of the split bench seat 20 into the vehicle more efficient and more cost effective, as well as providing an aesthetically pleasing appearance. The first 20a and second 20b seat portions preferably have seat restraint assemblies with attachment points supported by a vehicle frame member.

The bench seat 20 with SIR 30 should include a very robust seat attachment structure 12. The seat attachment structure 12 can accommodate high seat loads including all seat loading for the third seat portion 20c. The seat attachment structure 12 includes a unique seat bracket assembly 32 that effectively transfers the loads to vehicle body structures.

The seat bracket assembly 32 includes a rear cross member 34 that extends in a generally lateral direction between first 36 and second 38 side rails. The first 36 and second 38 side rails extend in a generally longitudinal direction with the first side rail 36 being positioned on one lateral vehicle side 40 and the second side rail 38 being positioned at an opposite lateral vehicle side 42. The rear cross member 34 is fastened and/or welded at opposing ends to each of the first 36 and second 38 side rails.

The rear cross member 34 includes a main body 50 with at least first 52 and second 54 extensions that are integrally formed within the main body 50. The first 52 and second 54 extensions extend in the longitudinal direction. A front cross member 56 extends in the lateral direction and is longitudinally spaced apart from the rear cross member 34. Thus, the front 56 and rear 34 cross members are generally parallel to each other, while the first 52 and second 54 extensions and the first 36 and second 38 side rails are generally parallel to each other.

The seat bracket assembly 32 also includes first 60 and second 62 longitudinal members extending between the front 56 and rear 34 cross members. The first 60 and second 62 longitudinal members are generally parallel to the first 36 and second 38 side rails and are generally perpendicular to the front 56 and rear 34 cross members.

Figure 5:
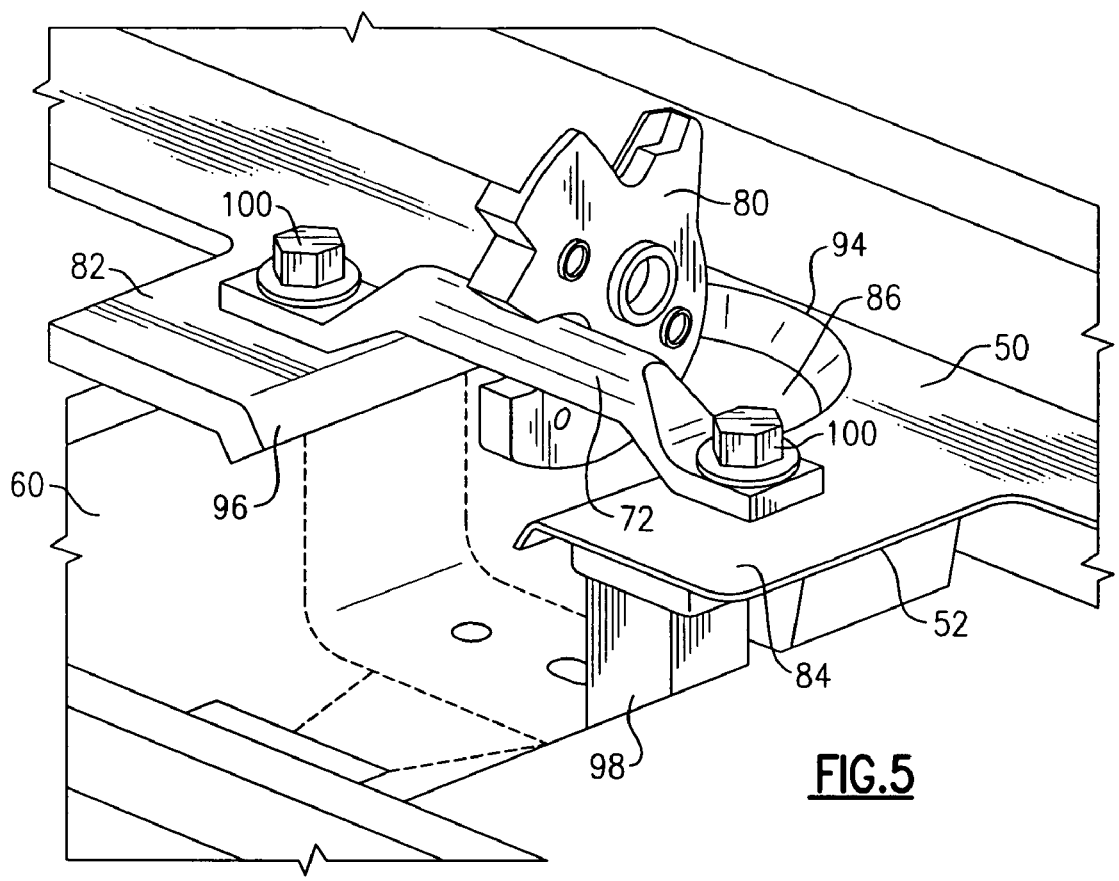
FIG. 5 is a perspective view of a striker/latch mechanism as utilized in the seat attachment structure of FIG. 4.

The first longitudinal member 60 is attached at one end 64 to the first extension 52 and at an opposite end 66 to the front cross member 56. The second longitudinal member 62 is attached at one end 68 to the second extension 54 and at an opposite end 70 to the front cross member 56. A first striker 72 is mounted to the first extension 52 and a second striker 74 is mounted to the second extension 54. A third striker 76 is mounted to the first side rail 36 and a fourth striker 78 is mounted to the second side rail 38. As shown in FIG. 5, latches 80 (only one is shown) are mounted on the seats 16a, 16b, or 20a, 20b, 20c and cooperate with the first 72, second 74, third 76, and fourth 78 strikers to selectively release the seats 16a, 16b or 20a, 20b, 20c from the strikers 72, 74, 76, 78, allowing the seats 16a, 16b or 20a, 20b, 20c to be moved to a tumbled position. A front mount provides pivotal movement to facilitate tumbling as known.

The first extension 52 includes first 82 and second 84 mount portions that are separated by a first opening 86 and the second extension 54 includes third 88 and fourth 90 mount portions that are separated by a second opening 92. The first 86 and second 92 openings each include an apex 94 that extends into the main body 50. The first striker 72 extends across the first opening 86 and has one striker end mounted to the first mount portion 82 and an opposite striker end mounted to the second mount portion 84. The second striker 74 extends across the second opening 92 and has one striker end mounted to the third mount portion 88 and an opposite striker end mounted to the fourth mount portion 90. A transversely extending flange 96 is formed about a perimeter that defines the openings 86, 92. The transversely extending flange 96 increases structural strength.

The first 86 and second 92 openings are preferably horseshoe or U-shaped openings; however, other opening shapes could also be used. The transversely extending flanges 96 preferably extend continuously about the perimeter that defines the U-shaped openings.

Optionally, straps 98 could be mounted to the first 52 and second 54 extensions, respectively. FIG. 5 shows an example of a strap 98. In this embodiment, one strap 98 would extend underneath the first longitudinal member 60. One strap end is mounted to the first mount portion 82 and an opposite strap end is mounted to the second mount portion 84. The strap ends are positioned on an opposite face of the first extension 52 from the first striker 72. A similar strap configuration would be used with the second longitudinal member 62 and second extension 54. Each strap end, as well as each striker end, is preferably bolted to the respective first 82, second 84, third 88, or fourth 90 mount portion with a single bolt 100, however, other attachment methods could also be used. The bolts 100 are also used to attach the first 72 and second 74 strikers to the first 52 and second 54 extensions.

The straps 98 are preferably made from steel. The straps 98 provide an extra metal stack-up that prevents the bolts 100 that are used to attach the first 72 and second 74 strikers to the first 52 and second 54 extensions from pulling through a floor structure under high seat loads.

Figure 6:
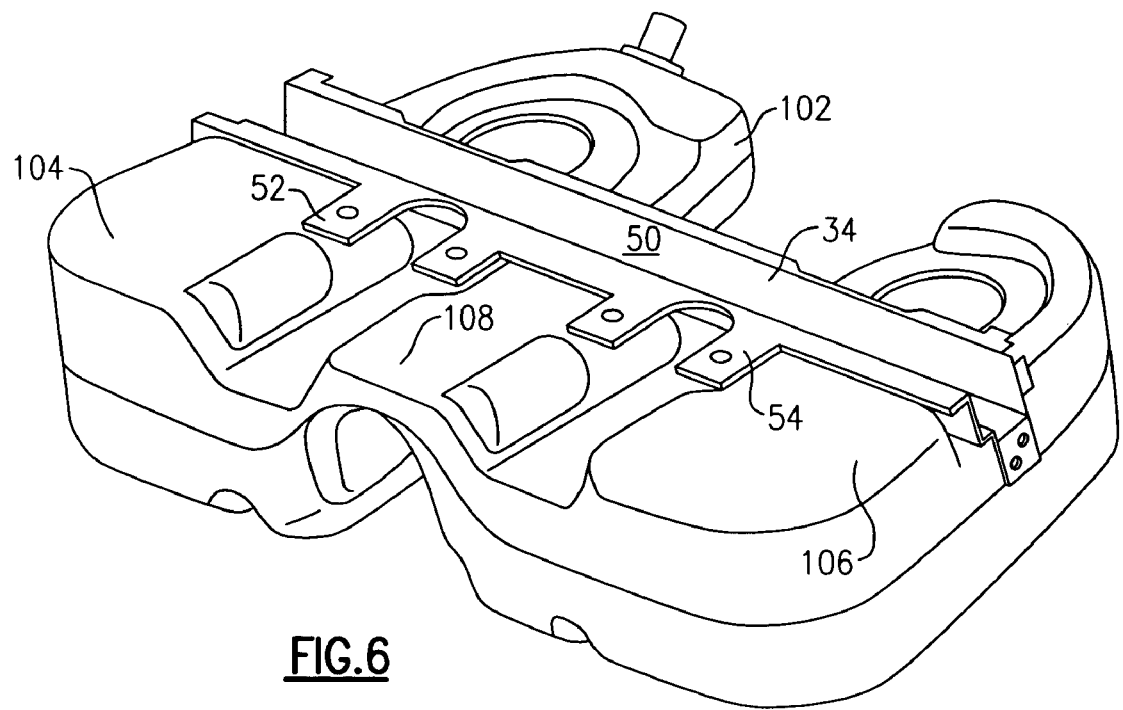
FIG. 6 is a perspective view of a cross member from the seat attachment structure of FIG. 4 positioned over a fuel tank.

As shown in FIG. 6, the rear cross member 34 is positioned vertically above, i.e. extends laterally over, a fuel tank 102. The fuel tank 102 is preferably a saddle type fuel tank that has a first lateral tank portion 104 and a second lateral tank portion 106 in fluid communication with each other via a narrower center tank portion 108. The first extension 52 is positioned on one side of the center tank portion 108 and the second extension 54 is positioned on an opposite side of the center tank portion 108. This configuration results in improved energy absorption properties.

In order to further enhance the energy absorption properties of the rear cross member 34, the rear cross member 34 and first 52 and second 54 extensions are preferably formed from an ultra-high strength steel grade DP600 material. DP600 has excellent mechanical hardening properties. DP600 also has higher deformability, higher yield strength, and higher ultimate strength properties than steel materials traditionally used to form seating brackets. The high energy absorption, excellent work hardening and bake hardening properties of DP600 in combination with the structural configuration of the rear cross member provides excellent system integrity.

Figure 3:
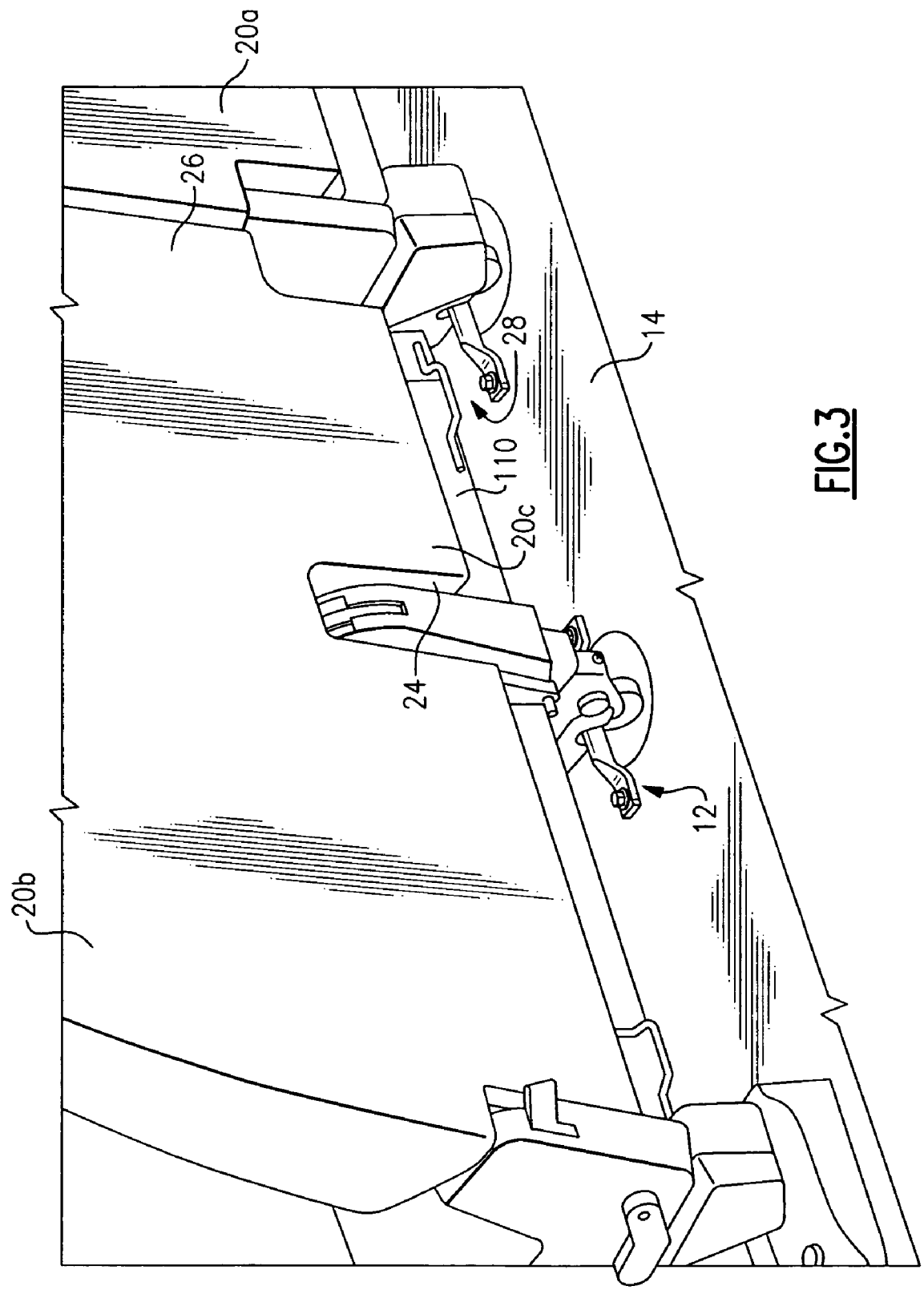
FIG. 3 is a perspective rear view, partially broken away, of a cantilever mounted split bench seat.
Figure 4:
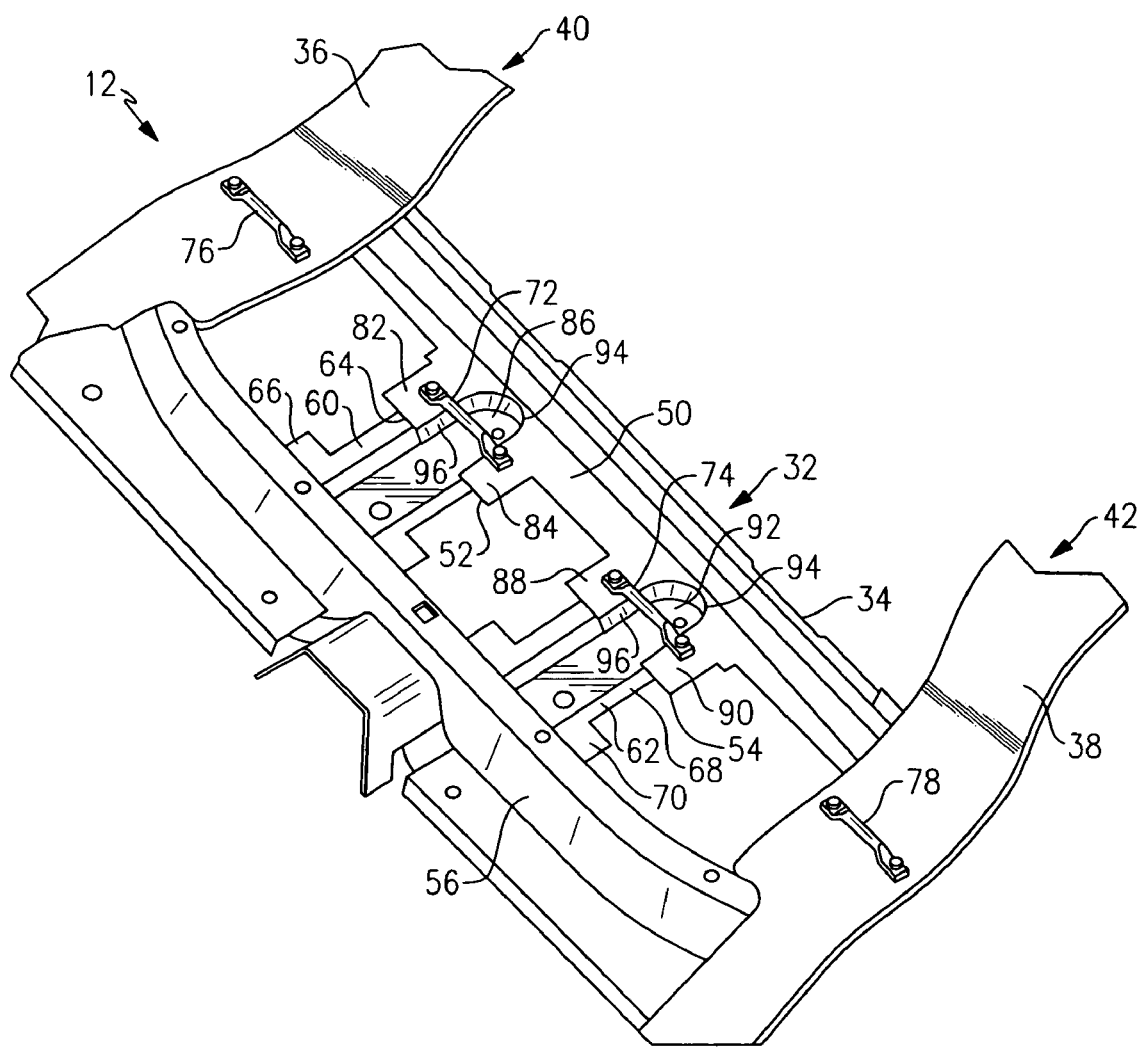
FIG. 4 is a perspective view of a seat attachment structure incorporating the subject invention.

Energy absorption is further enhanced by the vehicle underbody 14, i.e. the vehicle floor 14. The vehicle floor 14 is preferably formed from a front portion at the front of the seat assembly 10, shown most clearly in FIG. 2, and a rear portion at the rear of the seat assembly 10, shown most clearly in FIG. 3. The front portion of the vehicle floor 14 is preferably thicker than the rear portion, which assists in preventing forward seat travel during seat pull and which also minimizes local buckling.

As discussed above, the seat attachment structure 12 includes the third striker mounted 76 to the first side rail 36 at one lateral vehicle side 40 and the fourth striker 78 mounted to the second side rail 38 at an opposite lateral vehicle side 42. The first 72 and second 74 strikers are positioned between the third 76 and fourth 78 strikers. In the split bench seat configuration, the first 72 and third 76 strikers provide the tumble feature for the first seat portion 20a and the second 74 and fourth 78 strikers provide the tumble feature for the second 20b and third 20c seat portions. In the seat configuration with two separate seats 16a, 16b, the first 72 and third 76 strikers provide the tumble feature for one seat 16a and the second 74 and fourth 78 strikers provide the tumble feature for the other seat 16b.

Thus, in either seating configuration, the seat bracket assembly 32 includes eight total attachment points for attaching seats 16a, 16b or 20a, 20b, 20c to the vehicle underbody 14. There are four striker attachment points located at the rear of the seats 16a, 16b or 20a, 20b, 20c and four pivot attachment points located at the front of the seats 16a, 16b or 20a, 20b, 20c. The four striker attachment points comprise a first striker attachment point at the first strike 72, a second striker attachment point at the second striker 74, a third striker attachment point at the third striker 76, and a fourth striker attachment point at the fourth striker 78. The four pivot attachment points comprise a first pivot attachment point between one end of the front cross member 56 and the vehicle underbody 14, a second pivot attachment point between an opposite end of the front cross member 56 and the vehicle underbody, a third pivot attachment point between the front cross member 56 and the first longitudinal member 60, and a fourth pivot attachment point between the front cross member 56 and the second longitudinal member 62.

As discussed above, in the split bench seat configuration, the third seat portion 20c is cantilevered mounted at one lateral seat side 24 to the second seat portion 20b and is unsupported at an opposite lateral seat side 26. In the configuration shown, the third seat portion 20c is mounted at the one lateral seat side 24 at the second striker attachment point and at the fourth pivot attachment point. In other words, the third seat portion 20c is only supported along the second longitudinal member 62. The third seat portion 20c is supported at the second striker 74 mounted to the second extension 54 of the rear cross member 34, and at a pivot mount where the second longitudinal member attaches to the front cross member 56. The third seat portion 20c is unsupported at the opposite lateral seat side 26 as indicated by the gap 28 between a seat bottom 110 of the third seat portion 20c and a floor structure.

The combination of a cantilevered SIR seat with a tumble option is very unique in the industry. Further, having the rear cross member 34 and first 52 and second 54 extensions formed from DP600 used in combination with the first 60 and second 62 longitudinal members provides a very robust seat/underbody joint that can accommodate high seating loads for this unique seating combination.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A seat attachment structure comprising:
   a main body extending in a generally lateral direction between a pair of longitudinal side rails;
   at least first and second extensions formed within said main body and extending outwardly from said main body in a generally longitudinal direction; and
   at least first and second strikers wherein said first striker is mounted to said first extension and said second striker is mounted to said second extension.

2. The seat attachment structure according to claim 1 wherein said first extension includes first and second mount portions and a first opening extending between said first and second mount portions, said first striker extending across said first opening and having one end mounted to said first mount portion and an opposite end mounted to said second mount portion and wherein said second extension includes third and fourth mount portions and a second opening extending between said third and fourth mount portions, said second striker extending across said second opening and having one end mounted to said third mount portion and an opposite end mounted to said fourth mount portion.

3. The seat attachment structure according to claim 2 wherein said first and second openings are U-shaped openings with each of said U-shaped openings having an apex extending into said main body.

4. The seat attachment structure according to claim 3 wherein each of said U-shaped openings includes a transversely extending flange formed about a perimeter defining said U-shaped opening.

5. The seat attachment structure according to claim 1 including at least first and second longitudinal members extending generally parallel to said first and second extensions wherein said first longitudinal member has one end mounted to said first extension and said second longitudinal member has one end mounted to said second extension.

6. The seat attachment structure according to claim 5 wherein opposite ends of said first and second longitudinal members are mounted to a cross member extending generally parallel to said main body.

7. The seat attachment structure according to claim 6 including a first strap mounted to said first extension and extending underneath said first longitudinal member and a second strap mounted to said second extension and extending underneath said second longitudinal member.

8. The seat attachment structure according to claim 1 wherein said main body and said first and second extensions are formed from a DP600 material.

9. A seat attachment structure comprising:
   first and second side rails extending in a longitudinal direction and being laterally spaced apart from each other;
   a front cross member extending in a lateral direction and having one end mounted to said first side rail and an opposite end mounted to said second side rail;
   a rear cross member longitudinally spaced from said first cross member and having one end mounted to said first side rail and an opposite end mounted to said second side rail, said rear cross member including a main body extending along the lateral direction and including at least first and second extensions extending transversely to said main body; and
   first and second longitudinal members extending between said front and rear cross members wherein said first longitudinal member is mounted at one end to said first extension and at an opposite end to said front cross member and said second longitudinal member is mounted at one end to said second extension and at an opposite end to said front cross member.

10. The attachment structure according to claim 9 including at least first and second strikers wherein said first striker is mounted to said first extension and said second striker is mounted to said second extension.

11. The attachment structure according to claim 10 wherein said first extension includes a first U-shaped opening with said first striker extending in the lateral direction across said first U-shaped opening and said second extension includes a second U-shaped opening with said second striker extending in the lateral direction across said second U-shaped opening.

12. The attachment structure according to claim 11 wherein each of said first and second U-shaped openings includes a transversely extending flange formed about a perimeter defining said first and second U-shaped openings.

13. The attachment structure according to claim 9 wherein said real cross member is positioned vertically above a fuel tank.

14. The attachment structure according to claim 9 wherein said rear cross member is fastened and welded to said first and second side rails.

* * * * *

UNITED STATES PATENT AND TRADEMARK OFFICE
CERTIFICATE OF CORRECTION

| | |
|---|---|
| PATENT NO. | : 7,073,839 B2 |
| APPLICATION NO. | : 10/976332 |
| DATED | : July 11, 2006 |
| INVENTOR(S) | : Boyina et al. |

Page 1 of 1

It is certified that error appears in the above-identified patent and that said Letters Patent is hereby corrected as shown below:

Claim 13, Column 8, line 43: "real" should be --rear--

Signed and Sealed this

Seventeenth Day of October, 2006

JON W. DUDAS
*Director of the United States Patent and Trademark Office*